(12) United States Patent
Menix et al.

(10) Patent No.: US 11,089,774 B1
(45) Date of Patent: Aug. 17, 2021

(54) FURNITURE PROTECTION DEVICE

(71) Applicants: John H. Menix, Pataskala, OH (US); Joely Cook, Pataskala, OH (US)

(72) Inventors: John H. Menix, Pataskala, OH (US); Joely Cook, Pataskala, OH (US)

( * ) Notice: Subject to any disclaimer, the term of this patent is extended or adjusted under 35 U.S.C. 154(b) by 0 days.

(21) Appl. No.: 17/000,769

(22) Filed: Aug. 24, 2020

Related U.S. Application Data

(60) Provisional application No. 62/890,121, filed on Aug. 22, 2019.

(51) Int. Cl.
*A01M 29/30* (2011.01)
*A47C 7/62* (2006.01)
*A47C 17/86* (2006.01)
*A47B 97/00* (2006.01)

(52) U.S. Cl.
CPC .............. *A01M 29/30* (2013.01); *A47B 97/00* (2013.01); *A47C 7/62* (2013.01); *A47C 17/86* (2013.01)

(58) Field of Classification Search
CPC .......... A01M 29/30; A47C 7/62; A47C 17/86; A47B 97/00
USPC ...................................................... 297/463.1
See application file for complete search history.

(56) References Cited

U.S. PATENT DOCUMENTS

| | | | |
|---|---|---|---|
| 2,842,189 A * | 7/1958 | Gratt ...................... | A47C 31/11 297/227 |
| 5,103,769 A | 4/1992 | Macintosh | |
| 5,660,144 A * | 8/1997 | Venti ...................... | A01K 1/035 119/416 |
| 6,375,164 B1 * | 4/2002 | Siegler .................. | E01F 13/028 256/1 |
| 6,595,496 B1 * | 7/2003 | Langlie .................... | A01K 3/00 256/1 |
| 6,622,436 B1 * | 9/2003 | Kretsch .................... | A01K 3/00 256/40 |
| 6,637,815 B1 * | 10/2003 | Louque .................... | A47C 7/66 114/361 |
| 6,692,594 B1 | 2/2004 | Pemberton et al. | |
| 7,021,244 B2 | 4/2006 | Boyd | |
| 7,350,480 B1 * | 4/2008 | Hughes .................. | A01K 3/005 119/512 |
| 7,690,725 B1 * | 4/2010 | Rawlings ............... | A47C 31/11 297/229 |
| 8,460,690 B2 | 6/2013 | Downs | |

(Continued)

FOREIGN PATENT DOCUMENTS

CN 108244880 * 7/2018

OTHER PUBLICATIONS

Machine Translation of CN 108244880 from espacenet (Year: 2021).*

(Continued)

*Primary Examiner* — Mark R Wendell
(74) *Attorney, Agent, or Firm* — Cramer Patent & Design, PLLC; Aaron R. Cramer

(57) ABSTRACT

A furniture protection device comprises a cylinder having a retractable band and band attachment point. The cylinder is configured to be removable secured to an article of furniture on a first side while the band attachment point is configured to be removably secured to the article of furniture on a second side. The retractable band may then be unfurled from the cylinder and contacted to the band attachment point. When disposed, the band acts to prevent a pet from accessing the article of furniture.

19 Claims, 5 Drawing Sheets

(56) References Cited

U.S. PATENT DOCUMENTS

| | | | |
|---|---|---|---|
| 8,997,696 | B1 | 4/2015 | Wymer |
| 9,204,622 | B2 | 12/2015 | Wong et al. |
| 2008/0121349 | A1* | 5/2008 | De La Cruz ............ G09F 21/04 160/23.1 |
| 2008/0284217 | A1* | 11/2008 | Noonan ................ A47C 31/113 297/184.11 |
| 2014/0250788 | A1* | 9/2014 | Schild, III ............ A01M 29/30 49/58 |
| 2019/0133336 | A1* | 5/2019 | Ennis ..................... A47C 31/11 |

OTHER PUBLICATIONS

Couch Defender: Keep Pets Off of Your Furniture! Product Listing [online]. © 1996-2020, Amazon.com, Inc. [retrieved on May 31, 2018]. Retrieved from the Internet: <URL: https://www.amazon.com/Couch-Defender-Keep-Furniture-Beige/dp/B009JHYVNW>.

* cited by examiner

FURNITURE PROTECTION DEVICE

RELATED APPLICATIONS

The present invention is a continuation-in-part of, was first described in, and claims the benefit of U.S. Provisional Application No. 62/890,121 filed Aug. 22, 2019, the entire disclosures of which are incorporated herein by reference.

FIELD OF THE INVENTION

The present invention relates to a device capable of removable installation on a piece of furniture to prevent access thereto.

BACKGROUND OF THE INVENTION

Pets, such as dogs and cats are prevalent in many households. Pets have been bred for millennia to accompany humans and to provide companionship. As such, these pets are inherently trained to want to be with their owners all the time. This is especially true during moments of rest and relaxation.

Many times, these households have furniture that the owner wishes to relax in. Sometimes, the furniture serves a utilitarian purpose. Other times, the furniture is decorative, ornamental, or sometimes a work of art. In certain situations, it is desirable that the pets do not chew, destroy, or otherwise reside on the furniture so as to preventor eliminate damage due to their sharp nails or odor. Therefore, there has been seen a need to provide an invention that easily installs on to the furniture and prevents the pets from jumping on and off the furniture. A further benefit would be if such an invention is easily removed from the furniture when necessary.

SUMMARY OF THE INVENTION

The principles of the present invention provide for a furniture protective device which consists of a reel housing which has a slot located along a sidewall of the reel housing and a barrier which is attached to and deployable from the reel housing. The barrier has a first end and a second end. The furniture protective device also consists of a reel housed within the reel housing. The reel is attached to the first end of the barrier. The furniture protective device also consists of a distal housing which is affixed to the second end of the barrier. The distal housing is capable of removable attachment to a piece of furniture. The furniture protective device also consists of a reel hook which extends upwardly away from the reel housing flattened surface. The reel hook is capable of removable placement and attachment to a portion of the piece of furniture that is protected. The furniture protective device also consists of a distal hook which extends upwardly away from the distal housing flattened surface. The distal hook is capable of removable placement and attachment to a portion of the piece of furniture that is protected and serves a similar purpose to hook onto a support structure. The furniture protective device also consists of a reel housing bumper which surrounds the slot.

The sidewall of the reel housing may be a curvilinear wall. The reel housing may not be coextensive with a vertical length of the reel housing. The reel may be spring-loaded so as to provide tension to the barrier when the barrier is extended. The reel may have a tensioning mechanism that a slight tug on the barrier may result in a winding of the barrier on the reel. The reel may have a cylindrical shape which is sized to fit within the reel housing. The reel may have a reel carriage upper flange, a reel carriage lower flange of similar size and shape as a disk, and a reel center post which is attached to facing surfaces of the reel carriage upper and lower flanges.

The distal housing may be capable of removable attachment to the piece of furniture. The distal housing may be cylindrical and hollow. The furniture protective device may further consist of a curvilinear wall and a single longitudinal reel which houses a flattened surface. The furniture protective device may further consist of a reel hook which extends upwardly away from the reel housing flattened surface. The reel housing may be selected from the group consisting of material made out of metal, metal plating, or plastic.

The piece of furniture may be a couch or a chair. The attachment to a portion of the piece of furniture may be on an arm of the piece of furniture such that the reel housing may be suspended. The reel hook may be capable of incremental vertical adjustment relative to the reel housing. The distal hook may be capable of incremental vertical adjustment relative to the distal housing, similar to or identical with a vertical adjustment means of the reel hook relative to the reel housing. The reel housing bumper may be made of a deformable and protective material. The reel housing bumper may provide minimal to no clearance between an exterior environment and the slot, such that any foreign material carried on the barrier may not be introduced within the reel housing.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
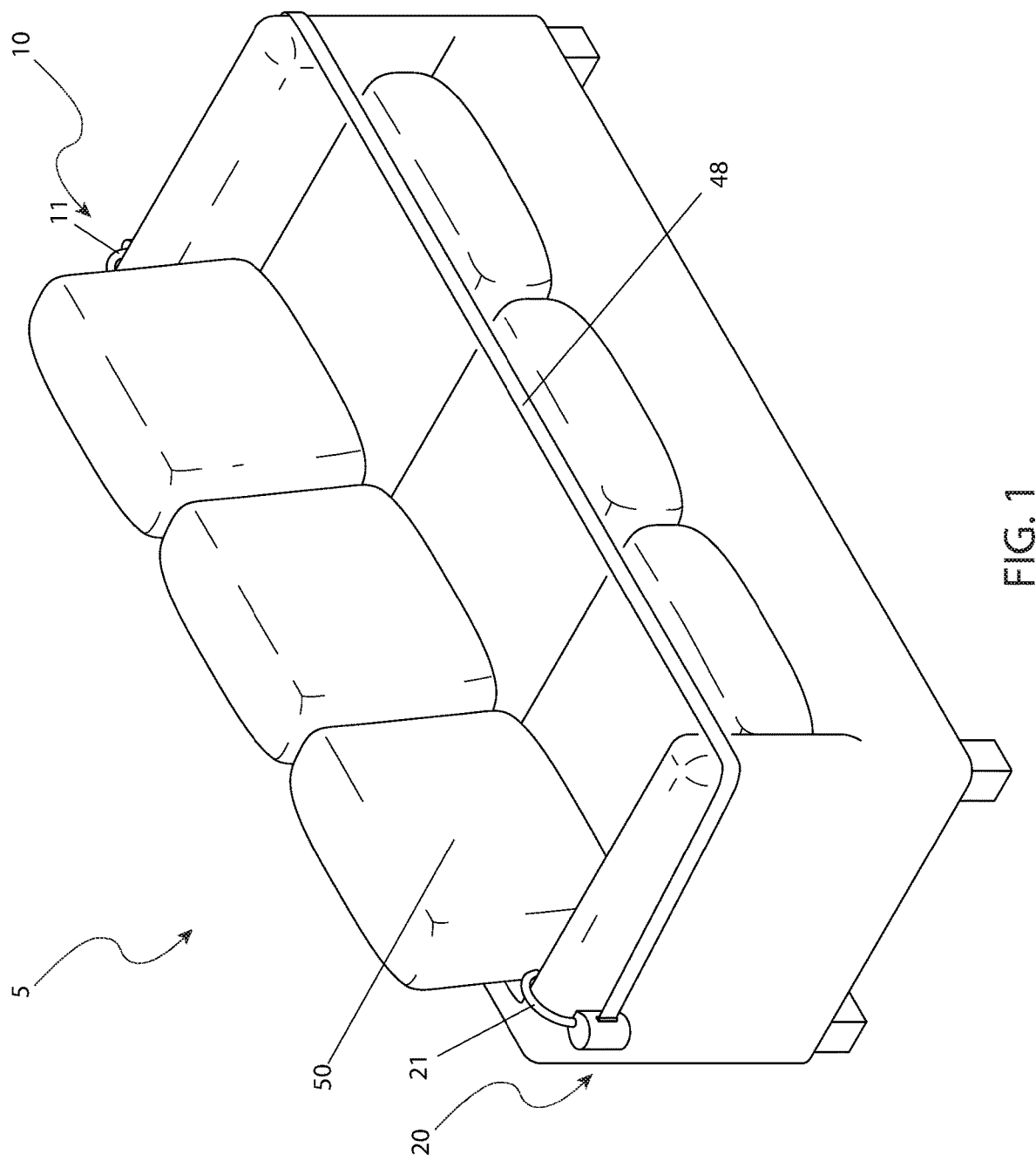
FIG. 1 is an environmental perspective view of a furniture protective device installed on a piece of furniture, according to a preferred embodiment of the present invention.
Figure 2:
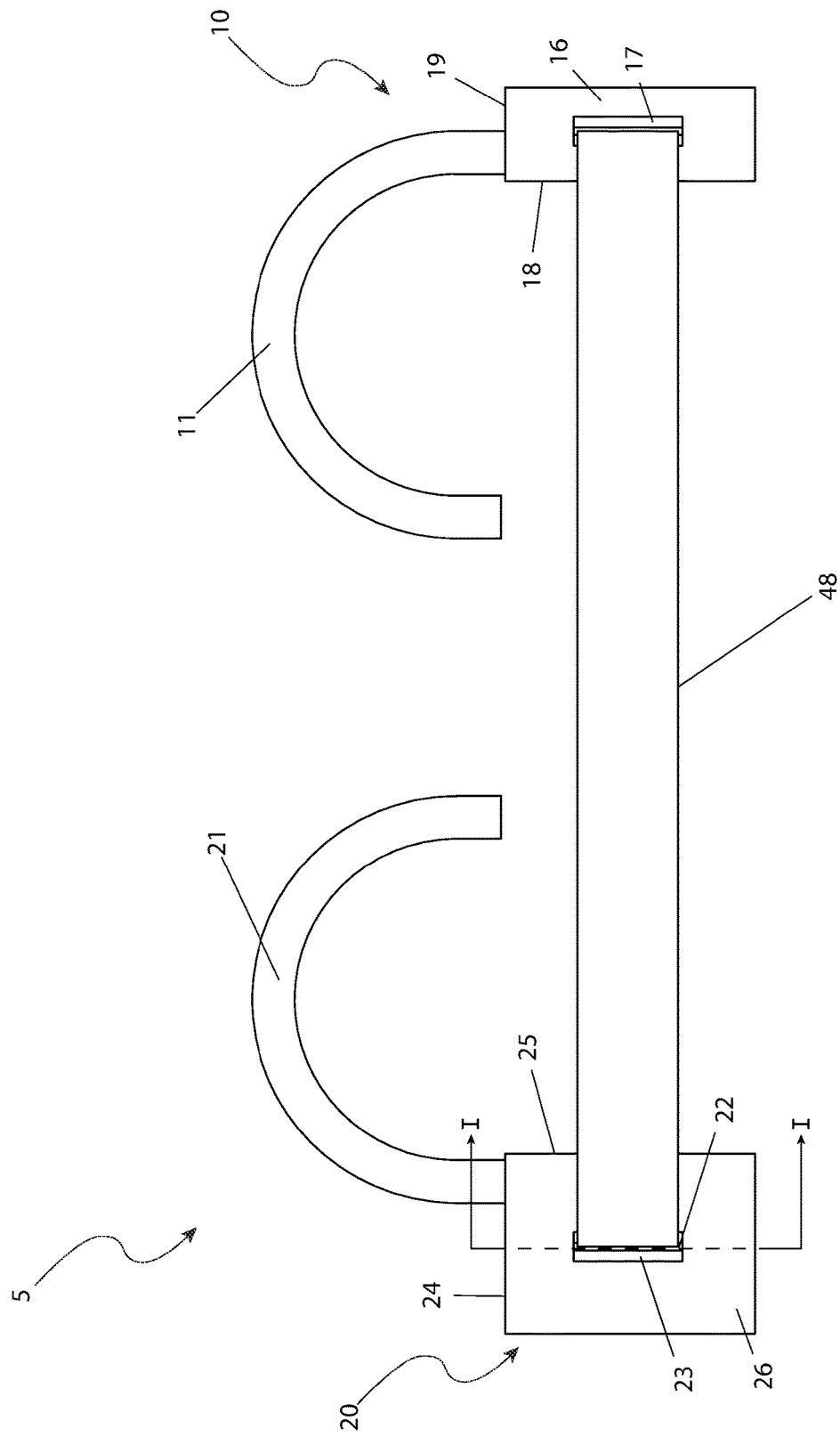
FIG. 2 is a side elevation view of the furniture protective device, according to the preferred embodiment of the present invention.
Figure 3:
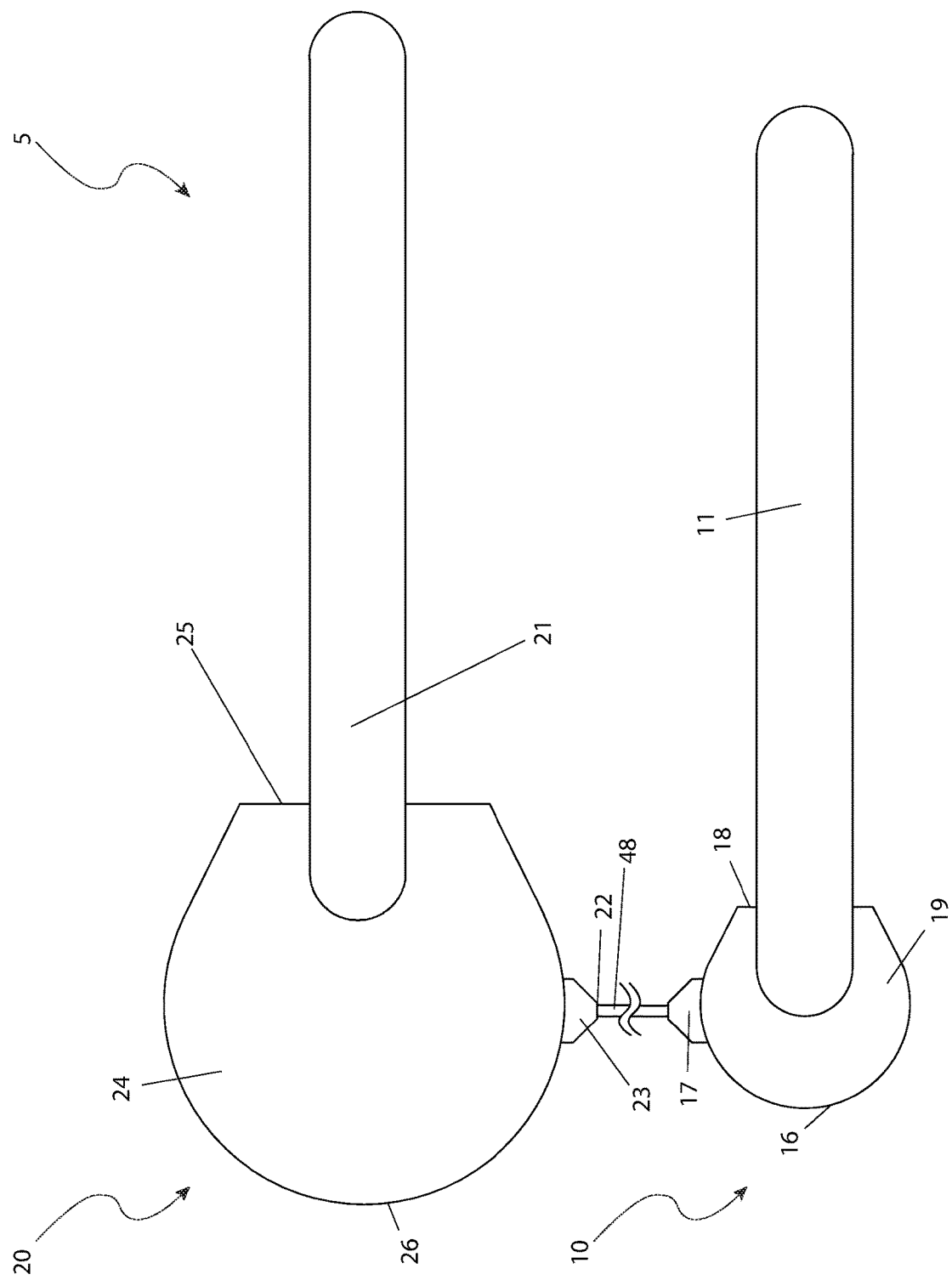
FIG. 3 is a top plan view of the furniture protective device, according to the preferred embodiment of the present invention.

DESCRIPTIVE KEY 5 furniture protective device
10 distal housing
11 distal hook
12 reel housing detent pin
13 reel hook aperture
14 distal housing detent pin
15 distal hook aperture
16 distal housing curvilinear wall
17 distal housing bumper
18 distal housing flattened surface
19 distal housing top wall 20 reel housing
21 reel hook
22 slot
23 reel housing bumper
24 reel housing lid
25 reel housing flattened surface
26 reel housing curvilinear wall
32 center aperture
33 reel housing side aperture
34 reel housing lid side aperture
35 block
40 reel
41a reel carriage upper flange
41b reel carriage lower flange
42 reel center post
45 upper post
46 lower post
47 upper post aperture
48 barrier
50 furniture

DESCRIPTION OF THE INVENTION

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

Detailed Description of the Figures

Referring now to FIGS. 1 through 5, there is herein described a furniture protective device (herein described as the "device" 5), which is capable of removable installation on a piece of furniture 50. In reference to FIG. 1, the piece of furniture 50 is typically a couch or chair, in which a user wishes to restrict or restrain ingress and egress relative to the furniture 50, such as by an unwanted animal. The device 5 more particularly includes a reel housing 20 with a barrier 48 attached to and deployable therefrom the housing 20. The barrier 48 has a first end that is attached to a reel 40 housed within the reel housing 20 and a second end that is affixed to a distal housing 10. The reel housing 20 and distal housing 10 are capable of removable attachment to the furniture 50.

The distal housing 20 is preferably cylindrical and hollow in shape, further having a reel housing curvilinear wall 26 and a single longitudinal reel housing flattened surface 25. The reel housing 20 is preferably manufactured out of a metal, a metal plating, or a plastic and is capable of withstanding normal use. Extending upwardly away from the location of the reel housing flattened surface 25 is a reel hook 21. The reel hook 21 is capable of removable placement and attachment to a portion of the piece of furniture 50 that is to be protected. In the exemplary embodiment of FIG. 1, this location on the furniture 50 is an arm, such that the reel housing 20 is suspended therefrom. The reel housing 20 further has a slot 22 located along a sidewall of the reel housing curvilinear wall 26 and is not coextensive with a vertical length thereof. A reel housing bumper 23 surrounds the slot 22 and has a deformable and protective material of construction. In some embodiments, the reel housing bumper 23 may provide minimal to no clearance between the environment and the slot 22, such that any foreign material carried on the barrier 48 cannot be introduced within the reel housing 20. Preferably, the location of the slot 22 is ninety degrees (90°) from the reel housing flattened surface 25. Preferably, the reel housing flattened surface is four inches (4 in.) in width.

Figure 4:
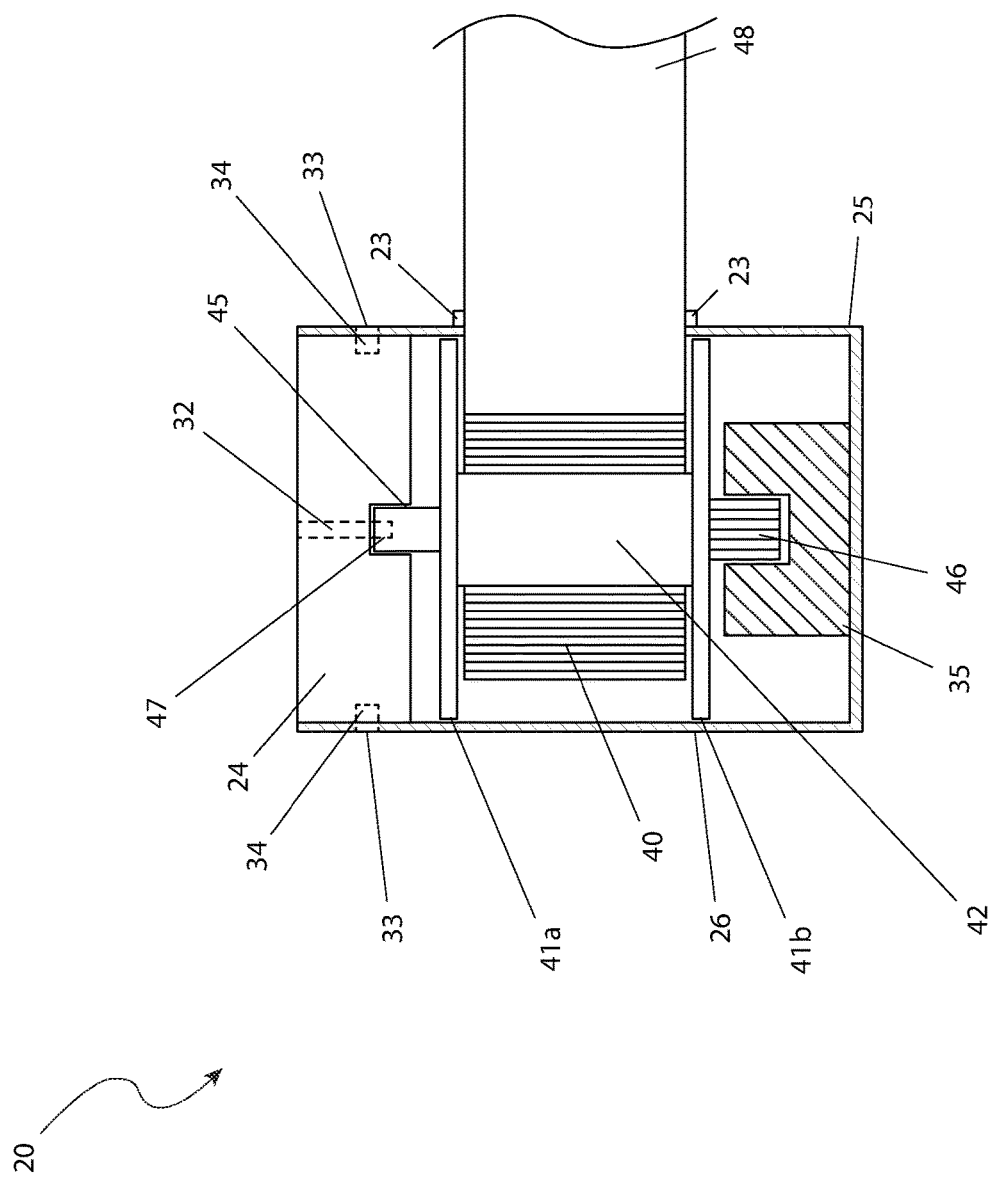
FIG. 4 is a cross-sectional view along the line I-I of the reel housing, according to the preferred embodiment of the present invention.

Referring now to FIG. 4, housed within the reel housing 20 is a reel 40 upon which a first end of the barrier 48 is affixed. In a preferred embodiment, the 40 reel is spring-loaded so as to provide tension to the barrier 48 when the barrier 48 is extended. A preferred embodiment is that the reel 40 has a tensioning mechanism that a slight tug on the barrier 48 will result in a winding of the barrier 48 on the reel 40. The reel 40 comprises a cylindrical shape sized to fit within the reel housing 20 and has a reel carriage upper flange 41a, a reel carriage lower flange 41b of similar size and shape as a disk, and a reel center post 42 attached to facing surfaces of the reel carriage upper and lower flanges 41a, 41b. A lower post 46 is affixed to the bottom face of the reel carriage lower flange 41b and extends into a block 35, such that the reel 40 rotates therein. The lower post 46 may be splined. The block 35 is affixed to the inner surface of the reel housing 20. An upper post 45 is affixed to the upper face of the reel carriage upper flange 41a. A reel housing lid 24 is capable of being placed within the open upper portion of the reel housing 20 and has a shape corresponding thereto. The reel housing lid 24 has a center aperture 32 capable of aligning with a reel upper post aperture 47 to receive a fastener therein, if necessary, or a plug. Such a fastener therein does not restrict rotation of the reel 40. The reel housing lid 24 also has a pair of reel housing lid side apertures 34 capable of aligning with reel housing side apertures 33 located on the outer surface of the reel housing 20 (either through the reel housing curvilinear wall 26 or reel housing flattened surface 25) to receive a fastener to fasten the reel housing lid 24 to the reel housing 20. The reel housing lid 24 may be formed as a unitary structure with the reel hook 21 that extends upward and downward therefrom, or includes an aperture permitting the passage of the reel hook 21.

The reel 40 is supported within the reel housing 20 such that it is aligned with the slot 22. As aforementioned, the barrier 48 has a first end affixed to the reel 40; more specifically, the first end of the barrier 48 is affixed to the reel center post 42. The barrier 48 is a resilient planar sheet material that is linear and is wound about the reel center post 42 between the reel carriage upper and lower flanges 41a, 41b. The barrier 48 may or may not be elastic and can incorporate any color, logo, or texture, so as to not interfere with the deployment and retraction thereof within the reel housing 20.

The second end of the barrier 48 is affixed to the distal housing 10. The distal housing 10 has an overall shape similar to the reel housing 20, in that it is generally cylindrical and has a distal housing curvilinear wall 16 and a distal housing flattened surface 18. A location on the distal housing curvilinear wall 16 has a distal housing bumper 17 in similar size, shape, orientation, and material to the reel housing bumper 23 and provides the point to which the second end of the barrier 48 is affixed. Extending upwardly away from the location of the distal housing flattened surface 18 is a distal hook 11. The distal hook 11 is capable of removable placement and attachment to a portion of the piece of furniture 50 that is to be protected and also serves a similar purpose to hook onto a support structure, such as furniture 50, as the reel hook 21. In the exemplary embodiment, such a support structure can be the opposing arm of the same piece of furniture 50 that the user wishes to protect.

Figure 5:
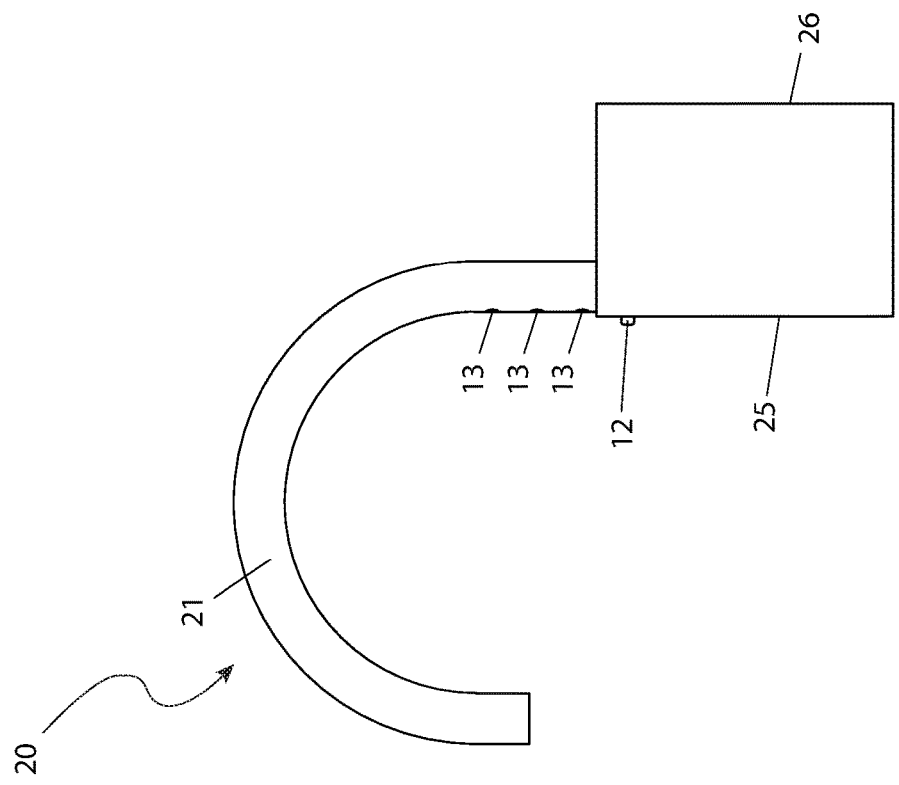
FIG. 5 is a side elevation view of the reel housing, according to the preferred embodiment of the present invention.

Referring now to FIG. 5, the reel hook 21 is capable of incremental vertical adjustment relative to the reel housing 20. The reel hook 21 has a hook portion (aforementioned to contact a support structure like furniture 50) and a linear extension portion that is capable of slidable engagement with the reel housing flattened surface 25 much like a telescoping handle for luggage. The linear extension portion is either integral with or passes through the reel housing lid 24 as aforementioned. A reel housing detent pin 12 located on the reel housing flattened surface 25 is capable of securing to a desired one (1) of a reel hook aperture 13 located on the linear extension portion of the reel hook 21. Other embodiments may provide for different means for selecting and securing vertical adjustment of the reel hook 21 relative to the reel housing 20.

Figure 6:
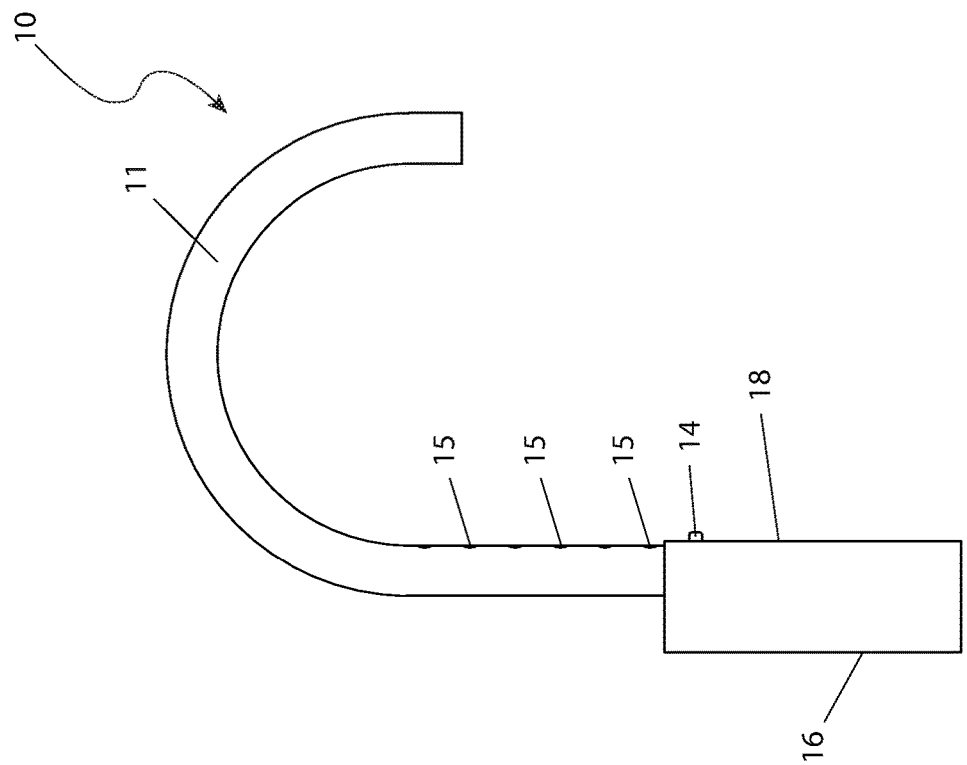
FIG. 6 is a side elevation view of the distal housing, according to the preferred embodiment of the present invention.

Referring now to FIG. 6, the distal hook 11 is capable of incremental vertical adjustment relative to the distal housing 10, similar to or identical with the vertical adjustment means of the reel hook 21 relative to the reel housing 20. The distal hook 11 has a hook portion (aforementioned to contact a support structure like furniture 50) and a linear extension portion that is capable of slidable engagement with the distal housing flattened surface 18 much like a telescoping handle for luggage. A distal housing detent pin 14 located on the distal housing flattened surface 18 is capable of securing to any one (1) of a desired distal hook aperture 15 located on the linear extension portion of the distal hook 11. Other embodiments may provide for different means for selecting and securing vertical adjustment of the distal hook 11 relative to the distal housing 10.

It is envisioned that the device 5 can be supported directly on the piece of furniture 50 that the user wishes to protect; however, the device 5 can be supported on a support structure that is adjacent to the piece of furniture 50. In the exemplary embodiment, the reel housing flattened surface 25 of the reel housing 20 is placed against the side of the furniture 50 such that the reel hook 21 hooks onto an arm located on a first side of the furniture 50. The distal housing 10 of the is grasped and pulled outward to pay out the barrier 48 from the reel 40. The length of the pulling directly corresponds to the length of the area the user wishes to prevent unauthorized access onto the furniture 50. The reel housing flattened surface 25 restricts movement, or "rolling" of the reel housing 20 when the distal housing 10 is being pulled. Once the desired amount of the barrier 48 is exposed, the distal housing flattened surface 18 is placed against the furniture 50. The distal hook 11 is then placed on the arm on the second side of the furniture 50. The reel hook 21 and distal hook 11 are positioned on the arms in such a way as to enable the barrier 48 to properly restrain access to the furniture 50. If necessary, the reel hook 21 can be vertically adjusted relative to the reel housing 20. Similarly, if necessary, the distal hook 11 can be vertically adjusted relative to the distal housing 10.

Other means of attaching the housings 10, 20 and/or barrier 48 to the furniture 50 can include a hook-and-loop-type fastener, a clasp, adhesive, or any other similar means.

Padding can be added to the hooks 11, 21, or a protective sleeve, to prevent damaging the furniture 50. Also, the size of the hooks 11, 21 (or other fasteners) can be envisioned to accommodate different geometries of the furniture 50 or large enough to restrain differ size animals. The length of the barrier 48, as well as the size of the housings 10, 20 can also be determined by the length of the area to be protected or size of the animal to be restricted.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A furniture protective device, comprising:
   a reel housing having a slot located along a sidewall of the reel housing;
   a barrier attached to and deployable from the reel housing, the barrier having a first end and a second end;
   a reel housed within the reel housing, the reel is attached to the first end of the barrier;
   a distal housing affixed to the second end of the barrier, the distal housing is capable of removable attachment to a piece of furniture;
   a reel hook extending upwardly away from the reel housing flattened surface, the reel hook is capable of removable placement and attachment to a portion of the piece of furniture that is protected;
   a distal hook extending upwardly away from the distal housing flattened surface, the distal hook is capable of removable placement and attachment to a portion of the piece of furniture that is protected and serves a similar purpose to hook onto a support structure; and
   a reel housing bumper surrounding the slot.

2. The furniture protective device, according to claim 1, wherein the sidewall of the reel housing is a curvilinear wall.

3. The furniture protective device, according to claim 1, wherein the reel housing is not coextensive with a vertical length thereof.

4. The furniture protective device, according to claim 1, wherein the reel is spring-loaded so as to provide tension to the barrier when the barrier is extended.

5. The furniture protective device, according to claim 1, wherein the reel has a tensioning mechanism that a slight tug on the barrier results in a winding of the barrier on the reel.

6. The furniture protective device, according to claim 1, wherein the reel having a cylindrical shape sized to fit within the reel housing.

7. The furniture protective device, according to claim 1, wherein the reel having a reel carriage upper flange, a reel carriage lower flange of similar size and shape as a disk, and a reel center post attached to facing surfaces of the reel carriage upper and lower flanges.

8. The furniture protective device, according to claim 1, wherein the distal housing is capable of removable attachment to the piece of furniture.

9. The furniture protective device, according to claim 1, wherein the distal housing is cylindrical and hollow.

10. The furniture protective device, according to claim 9, further comprising having a curvilinear wall and a single longitudinal reel housing flattened surface.

11. The furniture protective device, according to claim 1, further comprising a reel hook extending upwardly away from the reel housing flattened surface.

12. The furniture protective device, according to claim 1, wherein the reel housing is selected from the group consisting of material made out of metal, metal plating, or plastic.

13. The furniture protective device, according to claim 1, wherein the piece of furniture is a couch.

14. The furniture protective device, according to claim 1, wherein the piece of furniture is a chair.

15. The furniture protective device, according to claim 1, wherein the attachment to a portion of the piece of furniture is on an arm of the piece of furniture such that the reel housing is suspended therefrom.

16. The furniture protective device, according to claim 1, wherein the reel hook is capable of incremental vertical adjustment relative to the reel housing.

17. The furniture protective device, according to claim 1, wherein the distal hook is capable of incremental vertical adjustment relative to the distal housing, similar to or identical with a vertical adjustment means of the reel hook relative to the reel housing.

18. The furniture protective device, according to claim 1, wherein the reel housing bumper is made of a deformable and protective material.

19. The furniture protective device, according to claim 1, wherein the reel housing bumper provides minimal to no clearance between an exterior environment and the slot, such that any foreign material carried on the barrier cannot be introduced within the reel housing.

\* \* \* \* \*